(12) United States Patent
Matsushima (10) Patent No.: US 10,618,061 B2
(45) Date of Patent: Apr. 14, 2020

(54) SUPPORT STRUCTURE FOR ROTATION DRIVING SYSTEM HAVING BALL BALANCER

(71) Applicant: Tomy Kogyo Co., Ltd., Tokyo (JP)

(72) Inventor: Soichiro Matsushima, Tokyo (JP)

(73) Assignee: Tomy Kogyo Co., Ltd., Tokyo (JP)

( * ) Notice: Subject to any disclaimer, the term of this patent is extended or adjusted under 35 U.S.C. 154(b) by 482 days.

(21) Appl. No.: 15/501,214

(22) PCT Filed: Jul. 12, 2016

(86) PCT No.: PCT/JP2016/070518
§ 371 (c)(1),
(2) Date: Feb. 2, 2017

(87) PCT Pub. No.: WO2017/029910
PCT Pub. Date: Feb. 23, 2017

(65) Prior Publication Data
US 2017/0216851 A1 Aug. 3, 2017

(30) Foreign Application Priority Data
Aug. 20, 2015 (JP) .................. 2015-162481

(51) Int. Cl.
*B04B 9/14* (2006.01)
*F16F 15/08* (2006.01)
*B04B 9/12* (2006.01)
*B04B 5/04* (2006.01)

(52) U.S. Cl.
CPC .............. *B04B 9/14* (2013.01); *B04B 5/0414* (2013.01); *B04B 9/12* (2013.01); *F16F 15/08* (2013.01)

(58) Field of Classification Search
CPC . B04B 9/14; B04B 9/12; B04B 5/0414; F16F 15/08

USPC ..................................................... 494/12, 82
See application file for complete search history.

(56) References Cited

U.S. PATENT DOCUMENTS 6,132,354 A * 10/2000 Ohtsu ................. B04B 9/14
494/16
6,390,965 B1 * 5/2002 Matsushima ......... B04B 5/0414
494/16

FOREIGN PATENT DOCUMENTS

| JP | S57-103148 U | 6/1982 |
| JP | H07-42555 U | 8/1995 |
| JP | H10-42513 A | 2/1998 |
| JP | H11-262683 A | 9/1999 |

(Continued)

OTHER PUBLICATIONS

International Search Report of the International Searching Authority dated Aug. 9, 2016 for the corresponding international application No. PCT/JP2016/070518 (and English translation).

*Primary Examiner* — Walter D. Griffin
*Assistant Examiner* — Shuyi S. Liu
(74) *Attorney, Agent, or Firm* — Posz Law Group, PLC (57) ABSTRACT

A support structure for a rotation driving system having a ball balancer includes: a motor having a rotational shaft coupled to a rotational shaft of a rotor; the ball balancer provided on the rotor to reduce oscillating motion of the rotor; and a support part for coupling the motor to a housing, wherein the motor is coupled to the housing via an elastic member on a line in one direction (x-axis) perpendicular to an axial direction (z-axis) of the rotational shaft of the motor, and the motor is allowed to swing about the x-axis due to elastic deformation of the elastic member.

7 Claims, 9 Drawing Sheets

(56) References Cited

FOREIGN PATENT DOCUMENTS

| | | | |
|---|---|---|---|
| JP | 2009-208598 A | | 9/2009 |
| JP | 2009208598 A | * | 9/2009 |
| JP | 2014-121931 A | | 7/2014 |

* cited by examiner

SUPPORT STRUCTURE FOR ROTATION DRIVING SYSTEM HAVING BALL BALANCER

CROSS REFERENCE TO RELATED APPLICATIONS

This application is a U.S. national stage application of the International Patent Application No. PCT/JP2016/070518 filed on Jul. 12, 2016, and is based on Japanese Patent Application No. 2015-162481 filed on Aug. 20, 2015, the disclosures of which are incorporated herein by reference.

TECHNICAL FIELD

The present invention relates to a support structure for a rotation driving system for rotating and driving a rotor of a centrifugal separator, a washing machine, and the like, the rotation driving system having a motor with a rotational shaft coupled to the rotor, a ball balancer for reducing the oscillating motion (including vibration) of the rotor due to the anisotropy of the distribution of masses on the rotor, and a support part for coupling the motor to a housing.

BACKGROUND ART

Figure 9:
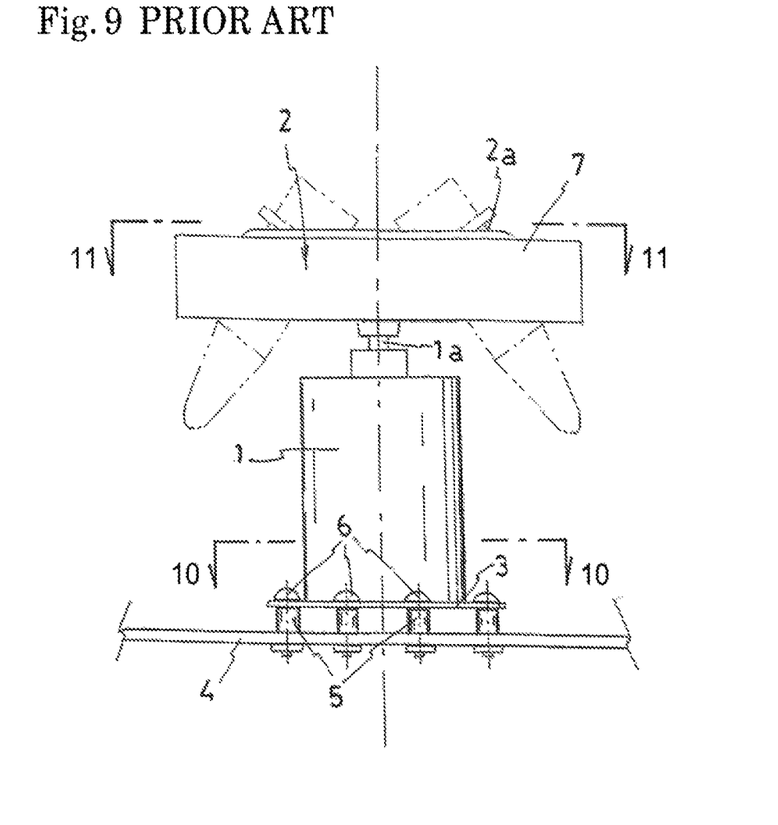
FIG. 9 is a front view showing an example of a centrifugal separator supported by a support structure for a rotation driving system according to the related art.

FIG. 9 is a side view conceptually showing an example of the support structure between the motor and the housing of a centrifugal separator according to the related art, the centrifugal separator having a mechanism to rotate a rotor with the motor.

In the centrifugal separator, a rotational shaft 1a of a motor 1 is coupled to a rotor 2, and the rotor 2 is provided with sample mounting parts 2a. The bottom part of the motor 1 is anchored to a flange 3 or integrally formed with the flange 3.

Figure 10:
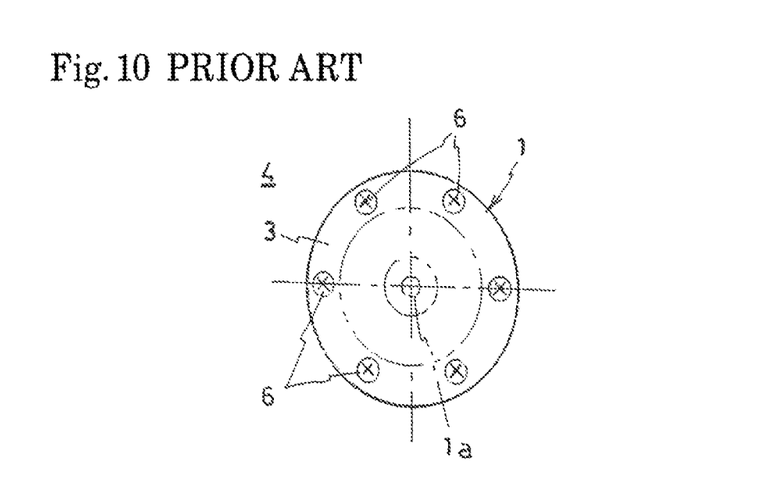
FIG. 10 is a sectional view taken along line 10-10 in FIG. 9 in the direction of the arrows.

FIG. 10 is a sectional view taken along line 10-10 in FIG. 9 in the direction of the arrows. The flange 3 and a housing 4 are coupled to each other by screws 6 via elastic members 5. Herein, in order for the housing 4 to receive a reaction occurring when the motor 1 rotates and drives the rotor 2, the screws 6 are arranged at even intervals, for example, in sets of four, six, or eight (six in the illustrated example) on the circumference about the motor 1, as shown in FIG. 10, such that the motor 1 is anchored to and supported by the housing 4 evenly in the peripheral direction.

In a device such as a centrifugal separator and a washing machine in which a rotor is rotated with a motor, there is a case where the substantial center of gravity of the rotor is eccentric relative to the axial center of the rotational shaft of the rotor due to an unbalanced distribution of masses on the rotor. In such a case, the rotor makes so-called oscillating motion relative to the rotational shaft of the motor and, in certain conditions, may end up hitting part of a housing, thereby causing a breakage accident.

Figure 11:
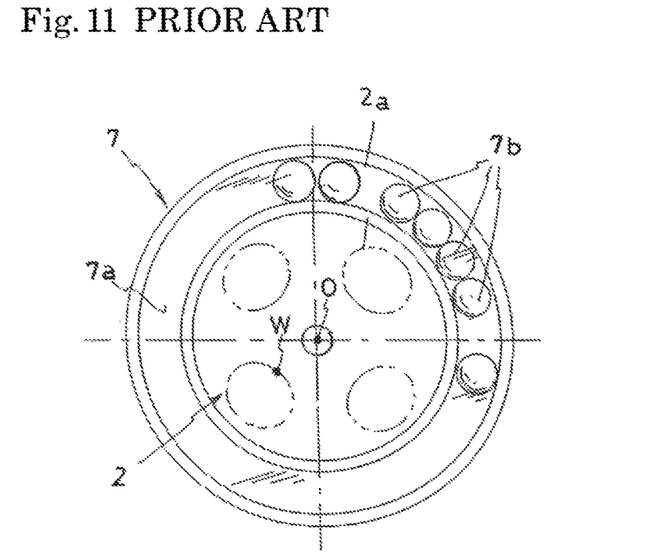
FIG. 11 is a sectional view taken along line 11-11 in FIG. 9 in the direction of the arrows.

For the purpose of reducing the oscillating motion, a dummy mass is arranged such that the distribution of the masses becomes symmetrical about the rotational shaft of the rotor so as to compensate for the unbalanced distribution of the masses on the rotor. However, since this method per se could be insufficient to obtain the intended results, a ball balancer is sometimes attached as a further countermeasure. The centrifugal separator shown in FIG. 9 is an example in which a centrifugal separator has the ball balancer 7, and FIG. 11 is a sectional view taken along line 11-11 in FIG. 9 in the direction of the arrows.

2

The ball balancer 7 has an annular path 7a and balls 7b, e.g. metal balls, that are placed in the annular path 7a such that the balls 7b do not fill up the annular path 7a completely but are freely movable therein, and the ball balancer 7 is arranged so that central lines of the rotational shaft of the rotor 2 and the annular path 7a coincide with each other. When the rotor 2 rotates, the annular path 7a of the ball balancer 7 also rotates. Then, due to friction caused between the annular path 7a and the balls 7b, the balls 7b also rotate in the annular path 7a along with the rotation of the rotor 2.

When the rotor 2 is eccentric, i.e., when the substantial center of gravity W of the rotor 2 with samples mounted thereon does not coincide with a rotational axis O of the rotor 2, the rotor 2 performs the oscillating motion about the rotational axis. At this time, the ball balancer 7 is caused to rotate about the rotational axis deviating from the central line of the annular path 7a, whereby friction occurs between the inner wall of the annular path 7a and the balls 7b and the balls 7b are subject to complex actions. It is known that when the ball balancer 7 rotates during the oscillating motion, the balls 7b make up an arrangement such as to reduce the oscillating motion.

FIG. 11 schematically shows an example of the arrangement of the balls 7b in the ball balancer 7 when the ball balancer 7 is functioning properly. As seen in a coordinate system rotating with the rotation of the rotating rotor 2, when the substantial center of gravity W of the rotor 2 is eccentric from the central line O of the annular path 7a of the ball balancer 7, the balls 7b move to appropriate positions on a side opposite to the substantial center of gravity W across a central line O and placed in arrangement such as to make the substantial center of gravity W coincide with the central line O of the annular path 7a (hereinafter the arrangement will be called "balanced arrangement"). According to this arrangement, the substantial eccentricity of the system including the rotor 2 and the ball balancer 7 is offset, resulting in the effect of reducing the oscillating motion.

Figure 12:
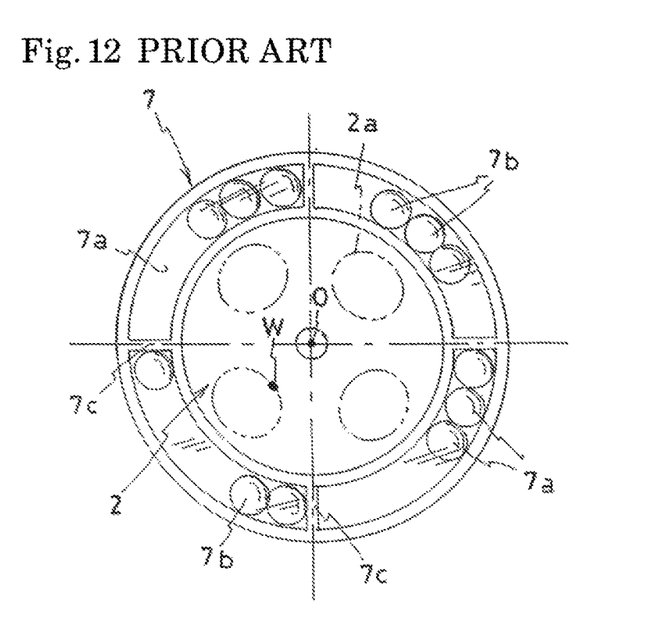
FIG. 12 is a view showing another embodiment of a ball balancer.

As shown in FIG. 12, the path 7a of the ball balancer 7 may be divided into a plurality of parts by a plurality of (four, for example) partitions 7c. In this case, the balls 7b of the ball balancer 7 are only allowed to move within the respective parts. This configuration is designed for cases including stoppage of the rotor, aiming at preventing the balls 7b from continuing to rotate in the annular path 7a due to inertia from the stoppage. Even if the annular path 7a is partitioned as described above, it is known that the balls 7b move in a direction opposite to a direction in which the substantial center of gravity W of the rotor is eccentric relative to the rotation center O of the rotor 2, so that the balls 7b make up an arrangement (balanced arrangement) to cancel out the effect of the eccentricity during rotation, similarly to the case in which the annular path 7a is not partitioned as shown in FIG. 11. However, since the balls 7b are not allowed to move across the partitions, the balls 7b are placed in arrangement according to which the balls 7b cancel out the eccentricity of the substantial center of gravity W within the respective partitions, as shown in FIG. 12, for example.

PTL 1 discloses a technology by which a centrifugal separator using the above ball balancer is allowed to smoothly operate without excessively increasing the vibration of a rotor when resonance of the rotor occurs, aims to increase a correction amount of an unbalanced mass at high-speed rotation and reduce the vibration of the rotor, and has the cross section of the annular path of the ball balancer formed in a prescribed shape.

CITATION LIST

Patent Literature

[PTL 1] Japanese Patent Application Laid-open No. H11-262683

SUMMARY OF INVENTION

Technical Problem

Figure 13:
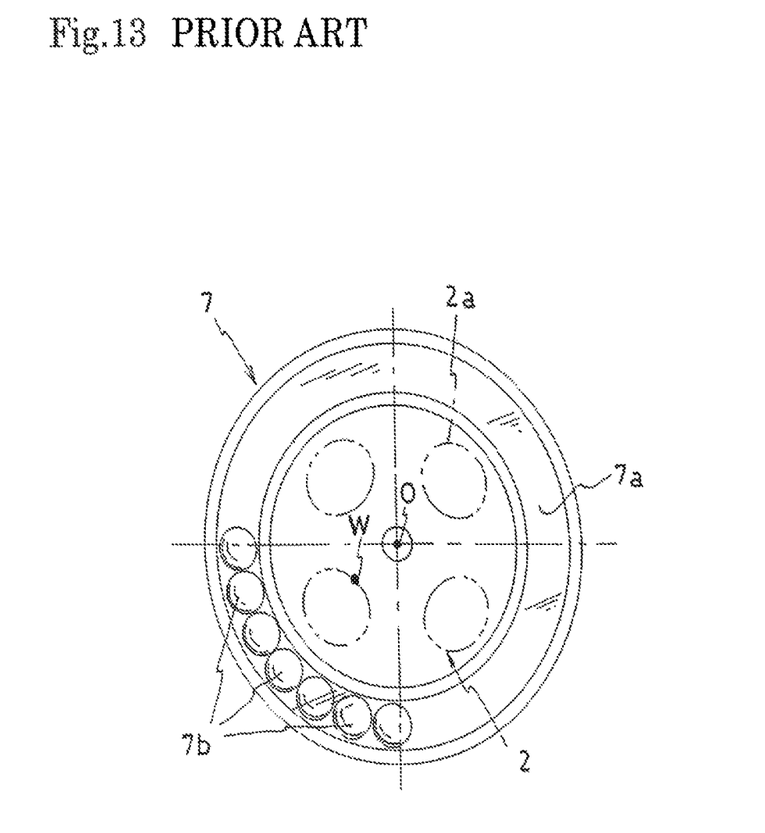
FIG. 13 is a sectional view taken along line 11-11 in FIG. 9 in the direction of the arrows.

The motion of the balls 7b in the annular path 7a of the ball balancer 7 is under the rule of a delicate balance. At high-speed rotation, the balls 7b are generally placed in the balanced arrangement to reduce eccentricity as shown in FIG. 11. However, at low-speed rotation, a phenomenon may occur in which the balls 7b gather on the same side as the substantial center of gravity W relative to the central line O, as shown in FIG. 13, and the balls 7b continue to be in this state (hereinafter, this arrangement will be called "unbalanced arrangement"). The unbalanced arrangement needs to be solved as soon as possible since the arrangement of the balls 7b may further aggravate the eccentricity of the rotor 2 and cause intense oscillating motion. In addition, there is a case where since the balls 7b are not placed in the accurate balanced arrangement due to the frictional force or the existence of small irregularities between the balls 7b and the annular path 7a even at the high-speed rotation, the ball balancer remains in a slightly unbalanced state, which causes the rotor to continue to vibrate. That is, there is a case where the ball balancer does not fully function.

The present invention has been made in view of the circumstances of the above related art and addresses the problem of proposing a support structure for a rotation driving system for rotating and driving the rotor of a centrifugal separator, a washing machine, and the like, the rotation driving system having a motor with a rotational shaft coupled to the rotor, a ball balancer for reducing the oscillating motion of the rotor due to the anisotropy of the distribution of masses on the rotor, and a support part for coupling the motor to a housing, wherein the balls of the ball balancer is easily placed in accurate balanced arrangement and hence the function of the ball balancer can be fully demonstrated.

Solution to Problem

In order to address the above problem, the present invention provides a support structure for a rotation driving system having a ball balancer described in the following items (1) to (6).

(1) A support structure for a rotation driving system having a ball balancer, for rotating a rotor rotating about a vertical rotational axis, the support structure including: a motor having a rotational shaft coupled to a rotational shaft of the rotor; the ball balancer provided on the rotor to reduce oscillating motion of the rotor; and a support part for coupling the motor to a housing, wherein the motor is coupled to the housing via an elastic member on a line in one direction (x-axis) perpendicular to an axial direction (z-axis) of the rotational shaft of the motor, and the motor is allowed to swing about the x-axis due to elastic deformation of the elastic member.

(2) The support structure for the rotation driving system having the ball balancer described in above item (1), wherein a stay coupled to the housing on the line in the one direction (x-axis) perpendicular to the axial direction (z-axis) of the rotational shaft of the motor is provided, the motor is suspended from or mounted on an intermediate part of the stay in a coupled manner, both end parts of the stay are coupled to the housing, both a coupling part between the stay and the motor and a coupling part between the stay and the housing or any one of the coupling parts involves coupling via the elastic member, and the motor is allowed to swing about the x-axis due to the elastic deformation of the elastic member.

(3) The support structure for the rotation driving system having the ball balancer described in the above item (2), wherein parts continuous to the intermediate part of the stay are folded to extend the stay along a side part of the motor, and both end parts of the stay are folded so as to run along the housing, the stay being coupled to the housing at the folded parts.

(4) The support structure for the rotation driving system having the ball balancer described in the above item (2), wherein the stay is a substantially linear-shaped plate, the motor is suspended from or mounted on the intermediate part of the stay to couple the stay and the motor to each other, and the stay and the housing are coupled to each other at both end parts of the stay.

(5) The support structure for the rotation driving system having the ball balancer described in the above item (2), wherein the elastic member is a rubber grommet, the rubber grommet is fitted into a hole pierced in the stay, and both coupling between the stay and the motor and coupling between the stay and the housing or any one of the couplings is provided by a screw penetrating the rubber grommet.

(6) The support structure for the rotation driving system having the ball balancer described in the above item (2), wherein the elastic member is a rubber vibration isolator, the rubber vibration isolator is disposed at both a space between the stay and the motor and a space between the stay and the housing or any one of the spaces, and both coupling between the stay and the motor and coupling between the stay and the housing or any one of the couplings is provided by screws provided at both ends of the rubber vibration isolator.

Advantageous Effects of Invention

According to a support structure for a rotation driving system having a ball balancer described in the above present invention, it is possible to provide a device in which irregular motion can be superimposed on the rotational motion of a motor, the state of balls can be changed to the state of accurate balanced arrangement even if the balls of the ball balancer are placed in the state of unbalanced arrangement or are not moved completely up to appropriate positions due to their friction with an annular path, and the function of the ball balancer can be fully demonstrated.

DESCRIPTION OF EMBODIMENTS

Hereinafter, with reference to the drawings, a description will be given in detail of embodiments of a support structure for a rotation driving system having a ball balancer according to the present invention. Note that members corresponding to members in the description of the support structure according to the related art will be denoted by the same reference signs, and their descriptions may be omitted as occasion demands.

Figure 1:
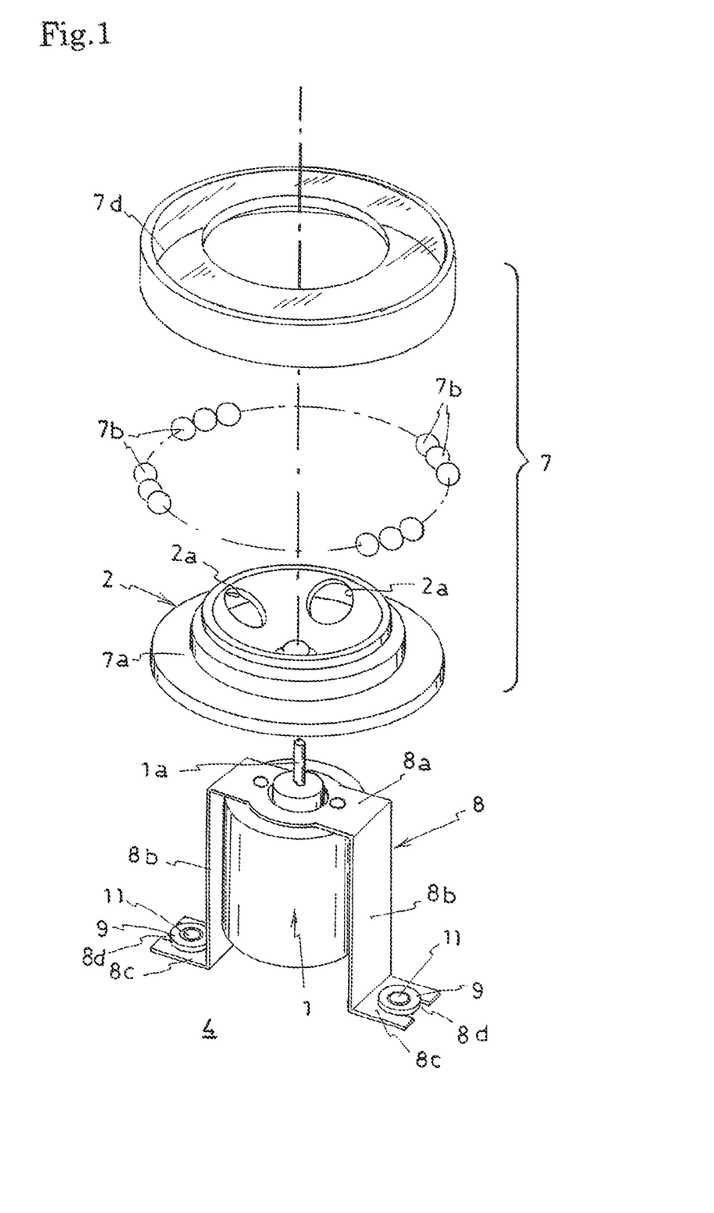
FIG. 1 is an exploded perspective view showing an embodiment of a centrifugal separator supported by a support structure for a rotation driving system according to the present invention.
Figure 2:
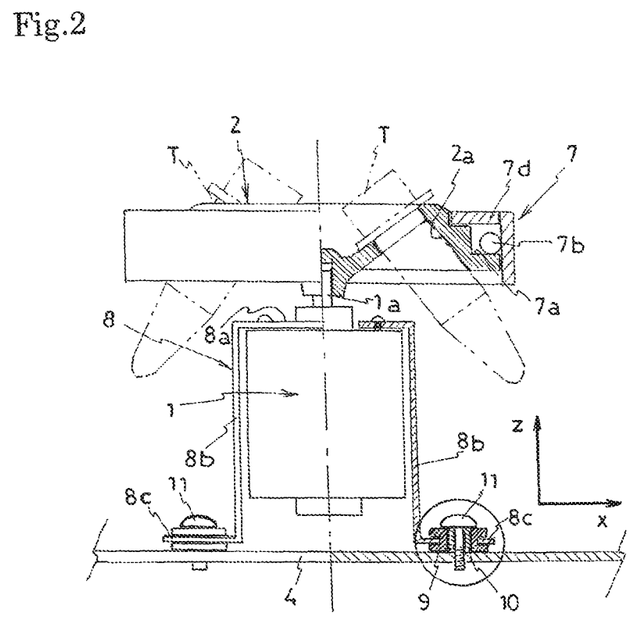
FIG. 2 is a half cross-sectional front view of the centrifugal separator shown in FIG. 1.

FIG. 1 is an exploded perspective view showing an embodiment of a centrifugal separator supported by the support structure for the rotation driving system according to the present invention, and FIG. 2 is a half cross-sectional front view of the centrifugal separator. A rotor 2 coupled to a motor 1 is provided with sample accommodation parts 2a that accommodate a tube T in which a sample to be separated by centrifugalization is placed. In the embodiment, the sample accommodation parts 2a are provided at four places of the rotor 2.

When the tubes T in which the sample is placed are accommodated in the sample accommodation parts 2a, the tubes T are arranged such that the distribution of masses on the rotor 2 is made as even as possible about a rotational shaft 1a. However, the amounts of the samples placed in the tubes T are not even in many cases, and the substantial center of gravity of the rotor 2 is likely to be eccentric from the rotation center of the rotor 2 due to a difference in the amounts of the samples, whereby the oscillating motion of the rotor 2 may occur. In order to reduce this, a ball balancer 7 is attached to the rotor 2. Note that the structure of the ball balancer 7 is the same as that of the above related art, and a newly-added member denoted by reference sign 7d represents a cover that retains balls 7b in an annular path 7a.

The rotor 2 is coupled to the motor 1 via the rotational shaft 1a of the motor 1. That is, the rotational shaft 1a of the motor 1 serves as a common rotational shaft between the motor and the rotor. In addition, the motor 1 is coupled to a housing 4 by a stay 8. In the related art, as shown in FIG. 10, the motor 1 is evenly coupled to the housing 4 by attachment tools such as the screws 6 arranged in substantially circular-symmetrical fashion about the rotational shaft 1a. In the support structure according to the present invention, in contrast, the motor 1 is coupled to the housing 4 of a device (including an intermediate member such as a partition plate anchored to the housing) by the stay 8 on a line in one direction.

In the embodiment shown in FIGS. 1 and 2, the stay 8 shows a shape obtained by folding a strip member into a substantially U-shape. Further, the stay 8 is coupled to the top surface of the motor 1 at its intermediate part 8a. A method for coupling the stay 8 includes screwing, welding, bonding, or the like. The stay 8 is extended along the side part of the motor 1 at its both side parts 8b, folded so as to run along the housing 4 at its both end parts 8c, and coupled to the housing 4 at both the end parts 8c.

Figure 3:
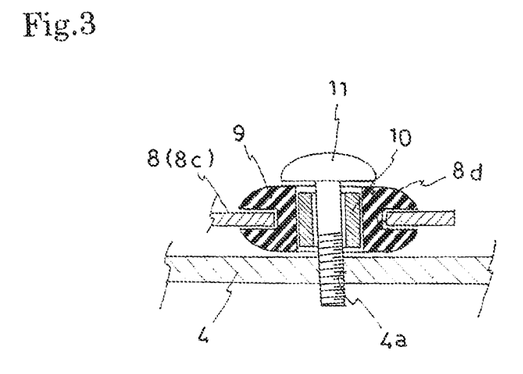
FIG. 3 is an enlarged cross-sectional view of a part at which a stay is coupled to a housing.

FIG. 3 is an enlarged cross-sectional view of a part at which the stay is coupled to the housing. Holes 8d are pierced into the end parts 8c of the stay 8, rubber grommets 9 and collars 10 are fitted into the holes 8d, and screws 11 are inserted into the rubber grommets 9 and the collars 10. When the screws 11 are threadedly engaged with taps 4a opened in the housing 4, the stay 8 is coupled to the housing 4.

Figure 4:
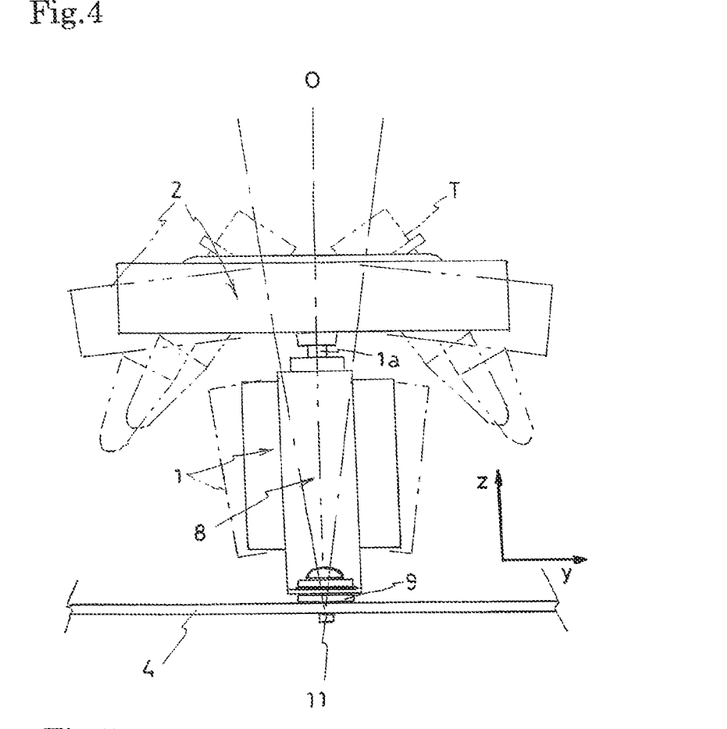
FIG. 4 is a side view of the centrifugal separator shown in FIG. 1.

FIG. 4 is a side view of the centrifugal separator shown in FIG. 1. As shown in the front view of FIG. 2 and the side view of FIG. 4, the axial direction of the rotational shaft 1a of the motor 1 is represented as a z-axis, a direction in which the screws 11 at both end parts 8c of the stay 8 are tightened is represented as an x-axis, and a direction perpendicular to the z-axis and the x-axis is represented as a y-axis. Herein, the housing 4 of the device is positioned within an x-y plane perpendicular to the z-axis.

As is clear from FIGS. 2 and 4, the motor 1 is only coupled to the housing 4 by the stay 8 via the rubber grommets 9 (elastic members) on a line parallel to the x-axis. Therefore, the motor 1 is allowed to swing about an axis parallel to the x-axis. On the other hand, the motor 1 is not allowed to swing about the y-axis perpendicular to the x-axis.

When the rotor 2 and the ball balancer 7 are rotated by the motor 1 supported as described above, the rotational shaft of the motor 1 performs rotational motion and the motor 1 is allowed to swing about the axis parallel to the x-axis. Therefore, the motion of the rotor 2 turns into irregular motion in which the swinging motion about the x-axis is superimposed on the rotational motion of the motor 1. As a result, a force resulting from superimposing the swinging motion about the x-axis on the rotational motion, rather than a force of simple rotational motion, is applied to the balls 7b in the ball balancer 7 that performs motion with the rotor 2. Since the cycle of the swinging motion is affected by the elastic constant or the like of the rubber grommets 9, the swinging motion and the rotational motion of the motor do not synchronize with each other. That is, the swinging motion acts as an irregular external force relative to the rotational motion.

For example, it is confirmed that, if the above irregular external force acts when the balls 7b in the ball balancer 7 are placed in unbalanced arrangement shown in FIG. 13, the state of the unbalanced arrangement is promptly ruffled and changes into the state of balanced arrangement. In addition, it is also confirmed that, if the above irregular external force acts when the balls 7b in the ball balancer 7 are not placed in the state of accurate balanced arrangement due to the frictional force, the existence of small irregularities, or the like between the balls 7b and the annular path 7a and stop at slightly deviated positions, the balls 7b are placed in the accurate balanced arrangement. This effect is also confirmed when the path 7a of the ball balancer 7 is an annular path or when the path 7a of the ball balancer 7 is divided by partitions 7c.

The most distinctive feature of the present invention is that the motor 1 is allowed to swing about the x-axis, the irregular external force is realized by the swinging motion about the x-axis, and the thus generated irregular external force applies energy to the balls, which are still moving without being settled in the accurate balanced arrangement, so as to place the balls into the accurate balanced arrangement.

Figure 5:
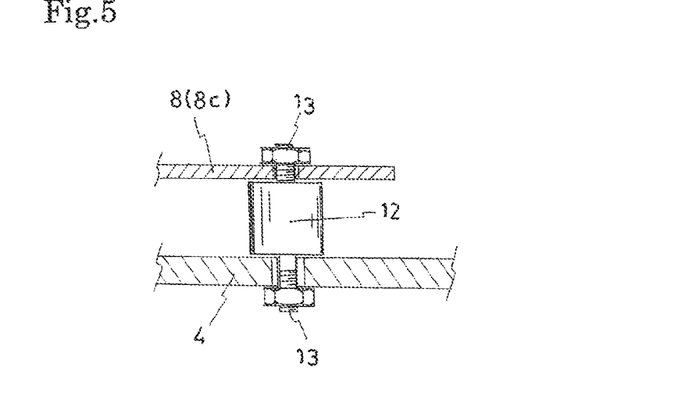
FIG. 5 is an enlarged cross-sectional view showing another embodiment of the part at which the stay is coupled to the housing.
Figure 6:
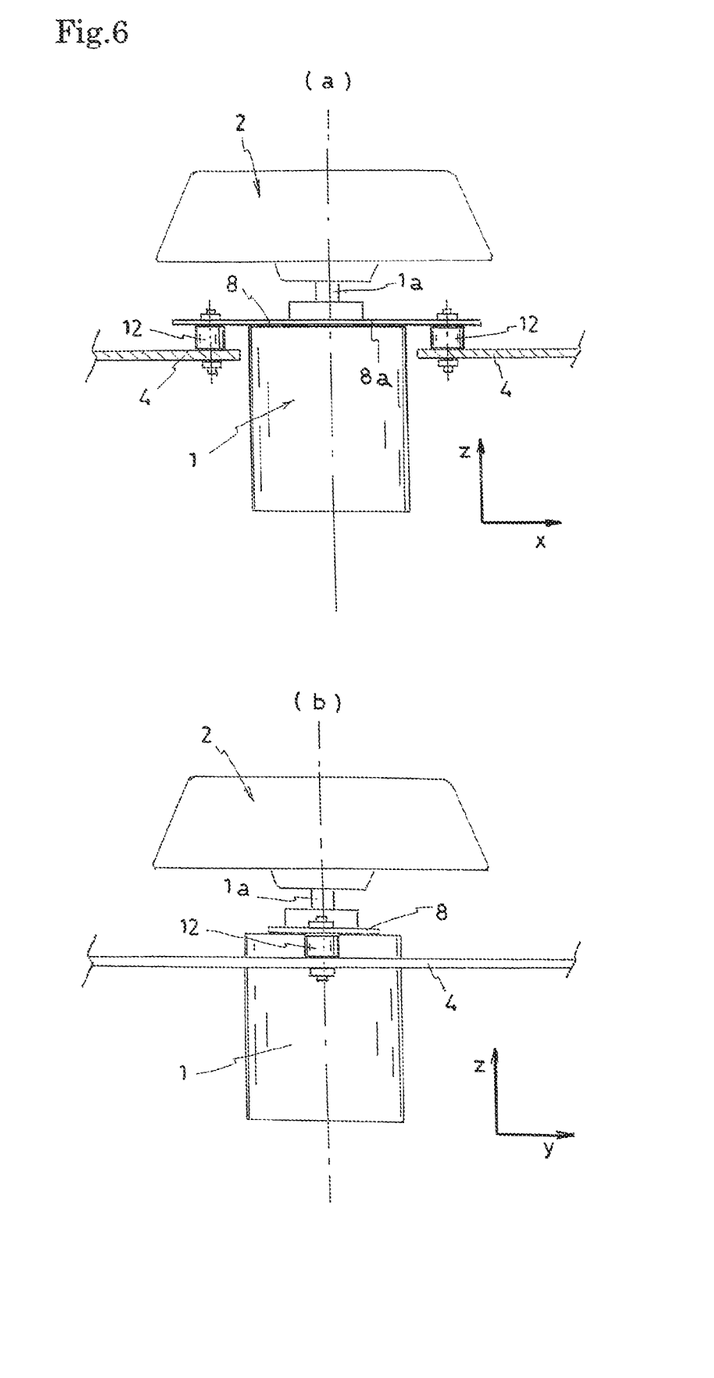
FIGS. 6(a) and 6(b) are views each showing another embodiment of the centrifugal separator supported by the support structure for the rotation driving system according to the present invention, FIG. 6(a) being a front view, FIG. 6(b) being a side view.
Figure 7:
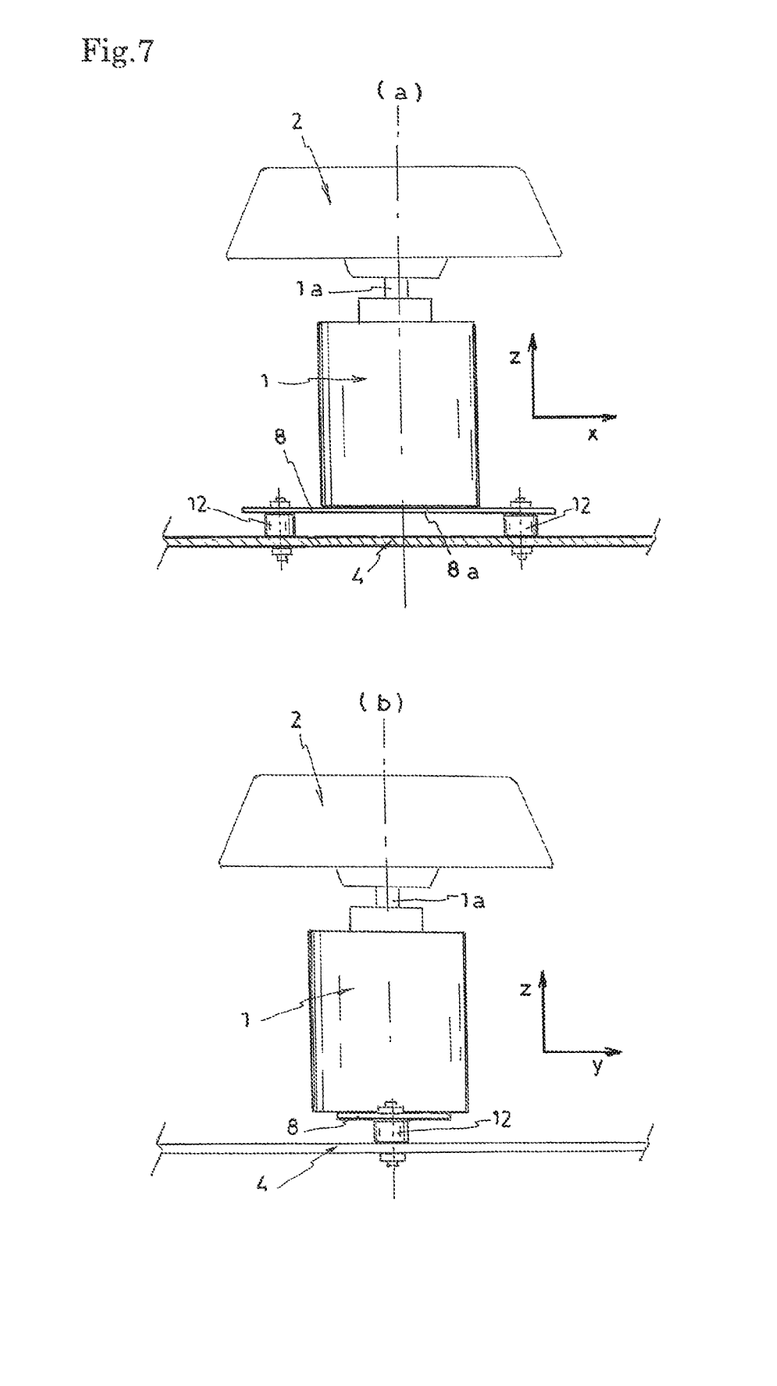
FIGS. 7(a) and 7(b) are views each showing still another embodiment of the centrifugal separator supported by the support structure for the rotation driving system according to the present invention, FIG. 7(a) being a front view, FIG. 7(b) being a side view.

FIG. 5 is an enlarged cross-sectional view showing, as another embodiment of the present invention, a structure in which the stay 8 is coupled to the housing 4 of the device via rubber vibration isolators 12. In the coupling structure, the rubber vibration isolators 12 are disposed between the end parts 8c of the stay 8 and the housing 4, and the stay 8 and the housing 4 are coupled to each other by screws 13 provided at both ends of the rubber vibration isolators 12. In addition, FIGS. 6 and 7 are diagrams each showing another embodiment of the centrifugal separator supported by the support structure for the rotation driving system according to the present invention. Members corresponding to the members in the embodiment of FIG. 1 are denoted by common reference signs, and their descriptions will be omitted. In each of these embodiments, the stay 8 is a substantially linear-shaped plate extending in the x-direction, and the motor 1 is suspended from (see FIG. 6) or mounted (see FIG. 7) on the intermediate part 8a of the stay 8 to couple the stay 8 and the motor 1 to each other. Further, in each of these embodiments as well, the stay 8 and the housing 4 (including an intermediate member such as a partition plate anchored to the housing) are coupled to each other via elastic members such as the rubber vibration isolators 12. Accordingly, even if the motor 1 is suspended from or mounted on the stay 8, the motor 1 is allowed to swing about the axis in the x-axis direction and the swinging motion superimposed on the rotational motion of the motor 1 is applied to the rotor 2 as in the case of the support structure of FIG. 1. As a result, when the balls in the ball balancer are not placed in the accurate balanced arrangement due to the frictional force or the like, the energy for moving the balls can be applied to the balls, with the result that the effect of changing the balls to the state of the accurate balanced arrangement is obtained.

As described above, the core of the present invention is that in the device having the rotor sharing the rotational shaft with the motor and having the ball balancer for reducing the oscillating motion, the irregular motion is superimposed on the rotational motion of the motor to change the state of the balls of the ball balancer to the state of the accurate balanced arrangement.

Each of the above embodiments describes in detail the support structure for the rotation driving system having the ball balancer according to the present invention, but the present invention is not limited to the above embodiments.

Figure 8A:
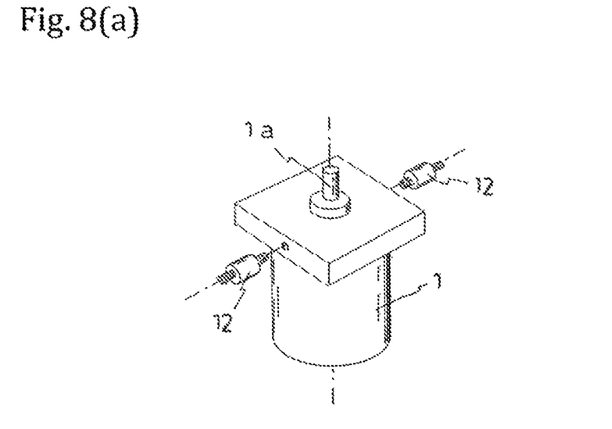
FIG. 8 is a schematic view showing various other embodiments of a motor supported by the support structure for the rotation driving system according to the present invention.
Figure 8B:
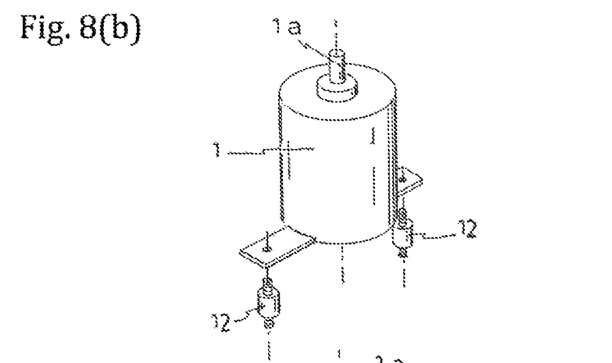
Figure 8C:
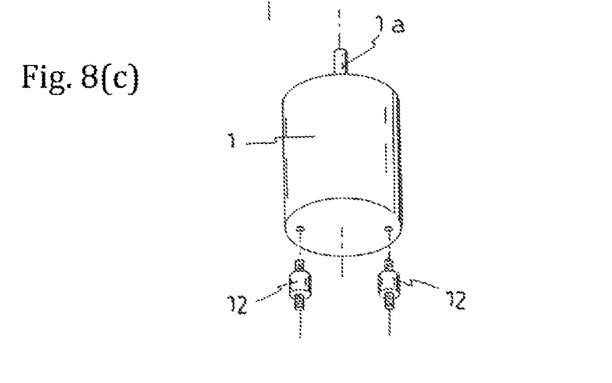

For example, in each of the above embodiments, the coupling parts between the stay 8 and the housing 4 involve the coupling via the elastic members, but the coupling part between the stay 8 and the motor 1 or both the coupling parts may involve the coupling via the elastic members. In addition, as shown in FIG. 8, the motor 1 may be configured to be directly coupled to the housing via the elastic members 12 without using the stay as a separate component. That is, if the support structures are such that the motor 1 is directly coupled to the housing or indirectly coupled to the same via the elastic members on the line in the one direction (x-axis) perpendicular to the axial direction (z-axis) of the rotational shaft 1a of the motor 1 and such that the motor is allowed to swing about the x-axis due to the elastic deformation of the elastic members, all these support structures fall within the technical idea of the present invention. Moreover, a device to which the present invention is to be applied is not limited to the centrifugal separator exemplified in the figures, but may be of course performed by a device in other embodiment based on the same technical idea.

INDUSTRIAL APPLICABILITY

Since the present invention can provide a device in which the balls of a ball balancer are easily placed in accurate balanced arrangement and hence the function of the ball balancer can be fully demonstrated, the present invention can be widely used as a support structure for a rotation driving system for rotating and driving the rotor of a centrifugal separator, a washing machine, and the like, having a ball balancer.

REFERENCE SIGNS LIST

1 Motor
1a Rotational shaft
2 Rotor
2a Sample accommodation part
3 Flange
4 Housing
4a Tap
5 Elastic member
6 Screw
7 Ball balancer
7a Annular path
7b Ball
7c Partition
7d Cover
8 Stay
8a Intermediate part
8b Side part
8c End part
8d Hole
9 Rubber grommet
10 Collar
11 Screw
12 Rubber vibration isolator
13 Screw
T Tube

The invention claimed is:

1. A support structure for a rotation driving system having a ball balancer, for rotating a rotor rotating about a vertical rotational axis, the support structure comprising:
    a motor having a rotational shaft coupled to a rotational shaft of the rotor;
    the ball balancer provided on the rotor to reduce oscillating motion of the rotor; and
    a support part for coupling the motor to a housing, wherein
    the motor is coupled to the housing via elastic members, all the elastic members extending on a line in one direction (x-axis) which is perpendicular to an axial direction (z-axis) of the rotational shaft of the motor, and the motor is allowed to swing about the x-axis due to elastic deformation of the elastic members.

2. The support structure for the rotation driving system having the ball balancer according to claim 1, wherein
a stay coupled to the housing on the line extending in the one direction (x-axis) which is perpendicular to the axial direction (z-axis) of the rotational shaft of the motor is provided,
the motor is suspended from or mounted on an intermediate part of the stay in a coupled manner,
both end parts of the stay are coupled to the housing, and
both a coupling part between the stay and the motor and a coupling part between the stay and the housing or any one of the coupling parts involves coupling via the elastic members.

3. The support structure for the rotation driving system having the ball balancer according to claim 2, wherein
parts continuous to the intermediate part of the stay are folded to extend the stay along a side part of the motor, and
both end parts of the stay are folded so as to run along the housing, the stay being coupled to the housing at the folded parts.

4. The support structure for the rotation driving system having the ball balancer according to claim 2, wherein
the stay is a substantially linear-shaped plate,
the motor is suspended from or mounted on the intermediate part of the stay to couple the stay and the motor to each other, and
the stay and the housing are coupled to each other at both end parts of the stay.

5. The support structure for the rotation driving system having the ball balancer according to claim 2, wherein
each of the elastic members is a rubber grommet,
the rubber grommet is fitted into a hole pierced in the stay, and
both coupling between the stay and the motor and coupling between the stay and the housing or any one of the couplings is provided by a screw penetrating the rubber grommet.

6. The support structure for the rotation driving system having the ball balancer according to claim 2, wherein
each of the elastic members is a rubber vibration isolator,
the rubber vibration isolator is disposed at both a space between the stay and the motor and a space between the stay and the housing or any one of the spaces, and
both coupling between the stay and the motor and coupling between the stay and the housing or any one of the couplings is provided by screws provided at both ends of the rubber vibration isolator.

7. A support structure for a rotation driving system having a ball balancer, for rotating a rotor rotating about a vertical rotational axis, the support structure comprising:
a motor having a rotational shaft coupled to a rotational shaft of the rotor;
the ball balancer provided on the rotor to reduce oscillating motion of the rotor; and
a support part for coupling the motor to a housing, wherein
the support part includes elastic members coupling the motor to the housing, all the elastic members extending along a line in one direction (x-axis) which is perpendicular to an axial direction (z-axis) of the rotational shaft of the motor, and
the support part is configured to allow the motor to swing about the x-axis due to elastic deformation of the elastic members upon rotation of the rotational shaft of the motor.

* * * * *